US011215482B2

(12) United States Patent
Geboers

(10) Patent No.: US 11,215,482 B2
(45) Date of Patent: Jan. 4, 2022

(54) DATA LOGGER, IN PARTICULAR FOR MONITORING AN ENVIRONMENT PARAMETER FOR STORING MEDICATION

(71) Applicant: Missio B.V., Valkenswaard (NL)

(72) Inventor: Josephus Joannes Antonius Geboers, Valkenswaard (NL)

(73) Assignee: MISSIO B.V., Valkenswaard (NL)

( * ) Notice: Subject to any disclaimer, the term of this patent is extended or adjusted under 35 U.S.C. 154(b) by 237 days.

(21) Appl. No.: 15/750,241

(22) PCT Filed: Aug. 2, 2016

(86) PCT No.: PCT/EP2016/068398
§ 371 (c)(1),
(2) Date: Feb. 5, 2018

(87) PCT Pub. No.: WO2017/021396
PCT Pub. Date: Feb. 9, 2017

(65) Prior Publication Data
US 2018/0224303 A1    Aug. 9, 2018

(30) Foreign Application Priority Data

Aug. 3, 2015    (EP) ...................................... 15179510
Nov. 27, 2015    (WO) .................. PCT/EP2015/077905

(51) Int. Cl.
*G01D 9/00*       (2006.01)
*G01K 1/022*     (2021.01)
(Continued)

(52) U.S. Cl.
CPC ............. *G01D 9/005* (2013.01); *G01K 1/022* (2013.01); *G06F 11/3013* (2013.01);
(Continued)

(58) Field of Classification Search
CPC . G01D 9/005; G06F 11/3013; G06F 11/3058; G06F 11/3476; G01K 1/022; G01K 2207/04
See application file for complete search history.

(56) References Cited

U.S. PATENT DOCUMENTS 4,400,783 A * 8/1983 Locke, Jr. .............. G01D 9/005
                                                        324/113
5,836,982 A * 11/1998 Muhlenberg ....... A61N 1/37276
                                                        607/9

(Continued)

FOREIGN PATENT DOCUMENTS

| CA | 2698078 A1 | 9/2011 |
| WO | 01/51836 A1 | 7/2001 |
| WO | 2004/036327 A1 | 4/2004 |

*Primary Examiner* — Alexander Satanovsky
(74) *Attorney, Agent, or Firm* — Richard M. Goldberg

(57) ABSTRACT

A data logger for logging values of a physical environment parameter as a function of time includes a sampling subsystem which acquires a sequence of sample values of the physical environment parameter at sampling moments which are separated by sample intervals, an encoding subsystem which converts the sequence of sample values in data records including a representative value representing groups of one sample value or a number of successive sample values with variations which meet a stability criterion and information representative of the lengths of the groups, a memory subsystem which stores a sequence of defined data, and the data logger is arranged to determine in which range of a plurality of ranges a sample of the environment parameter is located, and to use a stability criterion for the encoding which depends on the determined range.

21 Claims, 5 Drawing Sheets

(51) Int. Cl.
*G06F 11/30* (2006.01)
*G06F 11/34* (2006.01)

(52) U.S. Cl.
CPC ...... *G06F 11/3058* (2013.01); *G06F 11/3476* (2013.01); *G01K 2207/04* (2013.01)

(56) References Cited

U.S. PATENT DOCUMENTS

| | | | | |
|---|---|---|---|---|
| 2007/0267509 A1* | 11/2007 | Witty | ..................... | G01D 9/005 236/51 |
| 2008/0262313 A1* | 10/2008 | Shimizu | ................. | G01D 9/005 600/160 |
| 2016/0058661 A1* | 3/2016 | Pether | ................... | A61J 7/0084 455/557 |

* cited by examiner

DATA LOGGER, IN PARTICULAR FOR MONITORING AN ENVIRONMENT PARAMETER FOR STORING MEDICATION

FIELD OF THE INVENTION

The invention relates to a data logger for logging values of a physical environment parameter as a function of time, which data logger comprises: a sampling subsystem for acquiring a sequence of sample values of the physical environment parameter at sampling moments which are separated by sample intervals, an encoding subsystem arranged for converting the sequence of sample values in data records comprising a representative value representing groups of one sample value or a number of successive sample values with variations which meet a stability criterion, whereby the data records comprise information representative of the lengths of the groups, and a memory subsystem for storing a sequence of defined data records into a memory. The invention also relates to a package including a medication and provided with a data logger.

The invention further relates to a reading device for reading the logged data from the data logger and a method for making software for the reading device available for downloading.

BACKGROUND OF THE INVENTION

A data logger as mentioned in the openings part of the description is disclosed in US20070267509. This document discloses a data logger for use in refrigerated trailer for transporting goods which need cooled transport.

The disclosed data logger is less suitable for monitoring the environment parameters for goods, in particular medications, which are packed in small volumes.

For such applications it is crucial that the data logger is low cost, small in dimension and wherein efficient use is made of the available memory space. In particular for medications, for which the time between production and use can be very long. Storage periods of several years are no exception.

SUMMARY OF THE INVENTION

It is an object of the invention to provide a data logger in which a more efficient use is made of the available storage capacity of the memory for storing the data records.

This object is achieved by a data logger as defined in the openings paragraph, characterized in that the data logger is arranged to determine in which range of a plurality of ranges a sample of the environment parameter is located, and to use a stability criterion for the encoding which depends on the determined range.

The use of the data logger is in particular beneficial for monitoring the environment conditions in which a medication is stored. The efficacy of the medication is guaranteed until the so called expiry date as long as the temperature stays within a predetermined storage range. When the temperature exceeds the boundary of this range this affects the efficacy of the medication. The extent to which the efficacy is affected depends on the time duration that the temperature left the storage range and to which extent the temperature exceeds the boundaries of the storage range during this time duration. If the exposure of the medication to a temperature outside the first range stays limited then the reduction of the efficacy of the medication will be small, so that the medication can still be used. However, if the duration and/or the extent of the exceeding is substantial, then the efficacy of the medication can be so low that it cannot be used anymore. On the basis of the behaviour of the temperature outside the first range it can be determined whether the medication can be still used or not. For an accurate estimation of the reduction of the efficacy it is important that the behaviour of the temperature outside the storage range is known accurately, this in contrast with the behaviour of the temperature within the storage range, where the effect of the temperature on the efficacy is limited.

By logging the temperature with low accuracy when the temperature is within the storage range and with a high accuracy when the temperature has exceeded the boundaries of the storage range a substantial reduction of the required storage capacity of the memory can be achieved without a noteworthy effect on the quality of the monitoring.

In an embodiment of the data logger at least for one range the range dependent stability criterion is such that the criterion is met as long as the physical environment parameter remains within the said one range.

With this embodiment it is beneficial to select this at least one range such that it corresponds with the prescribed storage range of the medication. In that case a very good use is made of the fact that the exact temperature within the storage range is not crucial, which results in a very high reduction of the required storage capacity.

An embodiment of the data logger is arranged to set different criteria for at least three subsequent adjacent ranges, of which a first one is located between a second one and third one of the three ranges, whereby the range dependent stability criterion for the first range prescribes a less stable behaviour of the sample values than the range dependent stability criteria for the second and third range.

A further embodiment of the data logger is arranged to set criterion parameters for at least a fourth range which is adjacent to the second or third range, whereby the value of the criterion parameter for the fourth range prescribes a less stable behaviour of samples values than the value of the criterion parameter for the range adjacent the second or third range.

This embodiment is based on the insight that for some medications a maximum and/or minimum storage temperature exist. If this maximum or minimum temperature has been reached it is not allowed to use the medication any more, which makes the medication useless. When the fourth range is selected such that it corresponds with temperature range which makes the medication useless then a further reduction of the storage capacity is realized, in an embodiment of the data logger a length of the sampling interval is settable to a first length and to a second length which is different than the first length, whereby the sampling subsystem is arranged to set the length of the sample interval to the second length in response to a detection that a variation speed dependent stability criterion is not met, which variation dependent stability criterion indicates that the speed with the physical environment parameter changes over time exceeds a predefined level.

This embodiment has the benefit that for the periods that the temperature has a less stable behaviour the sample rate is increased. This reduces the risk that excursions of the temperature to extreme values are missed by the data logger. The lower sample rate is allowed for the stable periods, which results in a very efficient use of the storage capacity.

According to a second aspect of the invention the reader comprises a decoder for reconstructing the time behaviour of the environment parameter on the basis of the sample values comprised by the data records and the information in the data records representing the lengths of the groups.

In a further embodiment of the reading device the decoder is arranged to reconstruct the time behaviour of the environment parameter based on flag bits in the data records indicating with which of a plurality of sampling intervals the sample values are obtained, so as to reconstruct the time behaviour with a uniform time scale.

This embodiment enables a reliable interpretation of the effect of the behaviour of the monitored environment parameter in case the samples are taken with different sampling intervals.

A further embodiment of the reading device comprises a program controlled processor and a program memory with a program having command codes, which cause the reconverting and or creation of the function when the command codes are executed by the program controlled processor.

The use of the program controlled processor makes it possible to add the reader functionality to a programmable device that is already available for other functions, such as for example a Smartphone provided with an interface which is connectable to the data logger. A suitable way of coupling the reading device to a Smartphone makes use of NFC-technology, whereby both the data logger and the Smartphone are NFC-enabled.

This embodiment has further the benefit that the reading device can be easily updated by updating the software.

A further embodiment of the reading device comprises a display subsystem and wherein the program comprises command codes, which when executed by the processor, cause the display of a graph or table on a screen of the display subsystem, which represents the reconstructed tie behaviour.

With this embodiment the results of the data logging can be made visible to the user in a very comfortable way.

A further embodiment of the reading device is arranged to read data records from the memory of the data logger which represents a physical environment parameter of a stored medication, and wherein the program comprises command codes, which when executed by the processor estimate the efficacy of the medication on the basis of the reconstructed time behaviour and for displaying a message whether the estimated efficacy exceeds a minimum level.

In this way a very easy-to-use verification of the efficacy of a medication can be obtained, which in particular is of interest for the user of the medication, which in general has limited insight on the effect of the storage temperature behaviour on the efficacy of the medication.

It is beneficial to make the software for the reading device available for downloading on a server which can be coupled to the reading device via a communication network, such as the internet.

BRIEF DESCRIPTION OF THE DRAWINGS

These and other aspects and advantages of the invention will be apparent from and elucidated further with reference to the embodiments described by way of example in the following description and with reference to the accompanying drawings, in which.

DETAILED DESCRIPTION OF EMBODIMENTS

The invention relates to a data logger for logging values of a physical environment parameter as a function of time. Examples of such physical environment parameter can be an ambient temperature, humidity, light intensity, movements, noise etc. Although the data logger is suitable for logging different physical environment parameters the invention will be explained referring to a data logger for logging the ambient temperature of a product, in particular the ambient temperature of a medication. Many medications are temperature sensitive, which means that the efficacy of the medication is reduced if the medication is stored in an environment in which the temperature is not kept within a certain temperature range. In order to monitor the quality of the medication it is important to know whether the medication is not exposed too long to temperatures outside a prescribed temperature range. Logging the ambient temperature during the storage period is a very helpful tool to monitor the quality of the medication. There is a need for low cost data loggers which can be packaged together with the medication, for example by attaching a small sized data logger to a syringe with medication, a medication container or other package including a medication.

Figure 1:
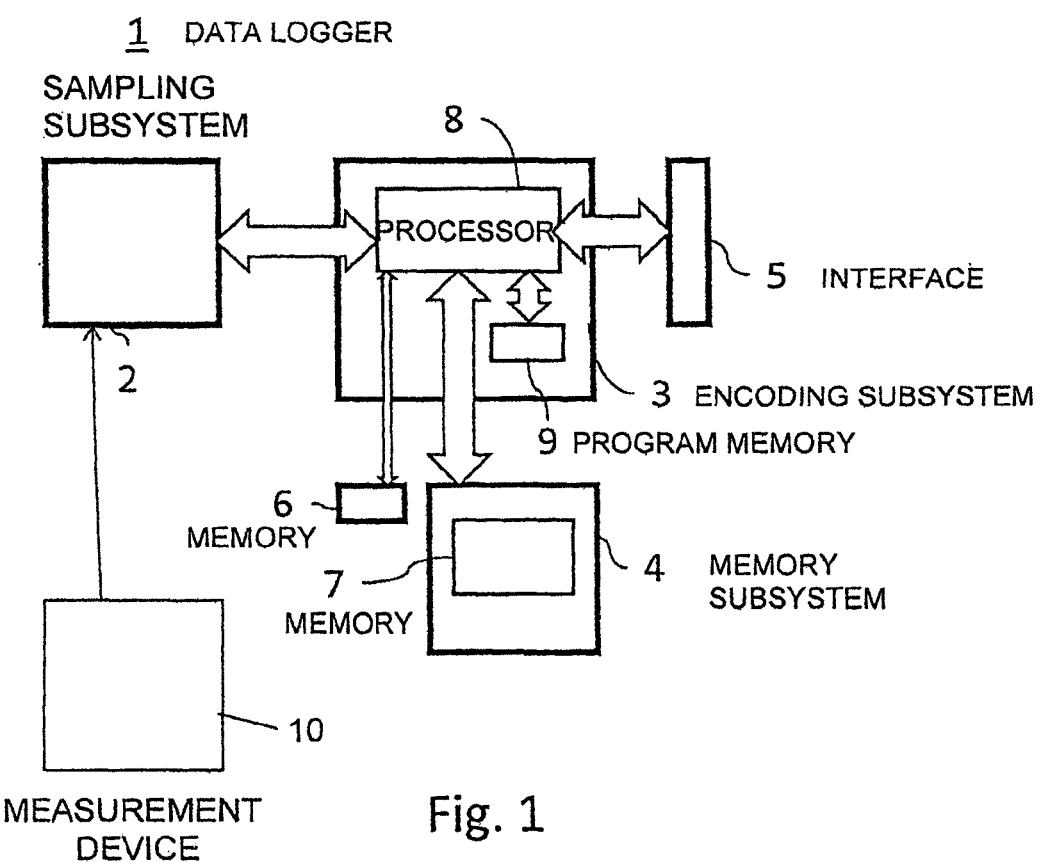
FIG. 1 shows schematically an embodiment of a data logger 1 according to the invention.

FIG. 1 shows schematically an embodiment of a data logger 1 according to the invention. The data logger comprises a measurement device 10 which provides measurement of, for example, ambient temperature, and a sampling subsystem 2 for acquiring sample values $T_n$ of an ambient temperature at successive sampling moments $t_n$ which are separated by sample intervals.

The sampling subsystem is coupled to an encoding subsystem 3 which converts the successive sample values into data records which are stored by a memory subsystem 4 in a memory 7 of the memory subsystem 4. The data logger 1 can further be provided with an interface 5 which enables the read out of the data records by means of a reading device. The interface can be of any type enabling the read out, but is preferably of at type which uses a wireless connection between the reading device and the interface 5. A very suitable interface is an NFC interface, which makes use of the so-called Near Field Communication-technology.

The encoding subsystem 3 is preferably implemented as a program controlled processor 8 which encodes the sequence of sample values under control of firmware stored in a program memory 9 of the encoding subsystem 3. However it will be clear for the skilled person that the encoding subsystem can also be implemented as a hardwired encoding subsystem.

An encoding method performed by the encoding subsystem under control of the firmware stored in the program memory 9 will be explained with reference to FIGS. 2 and 3.

Figure 2:
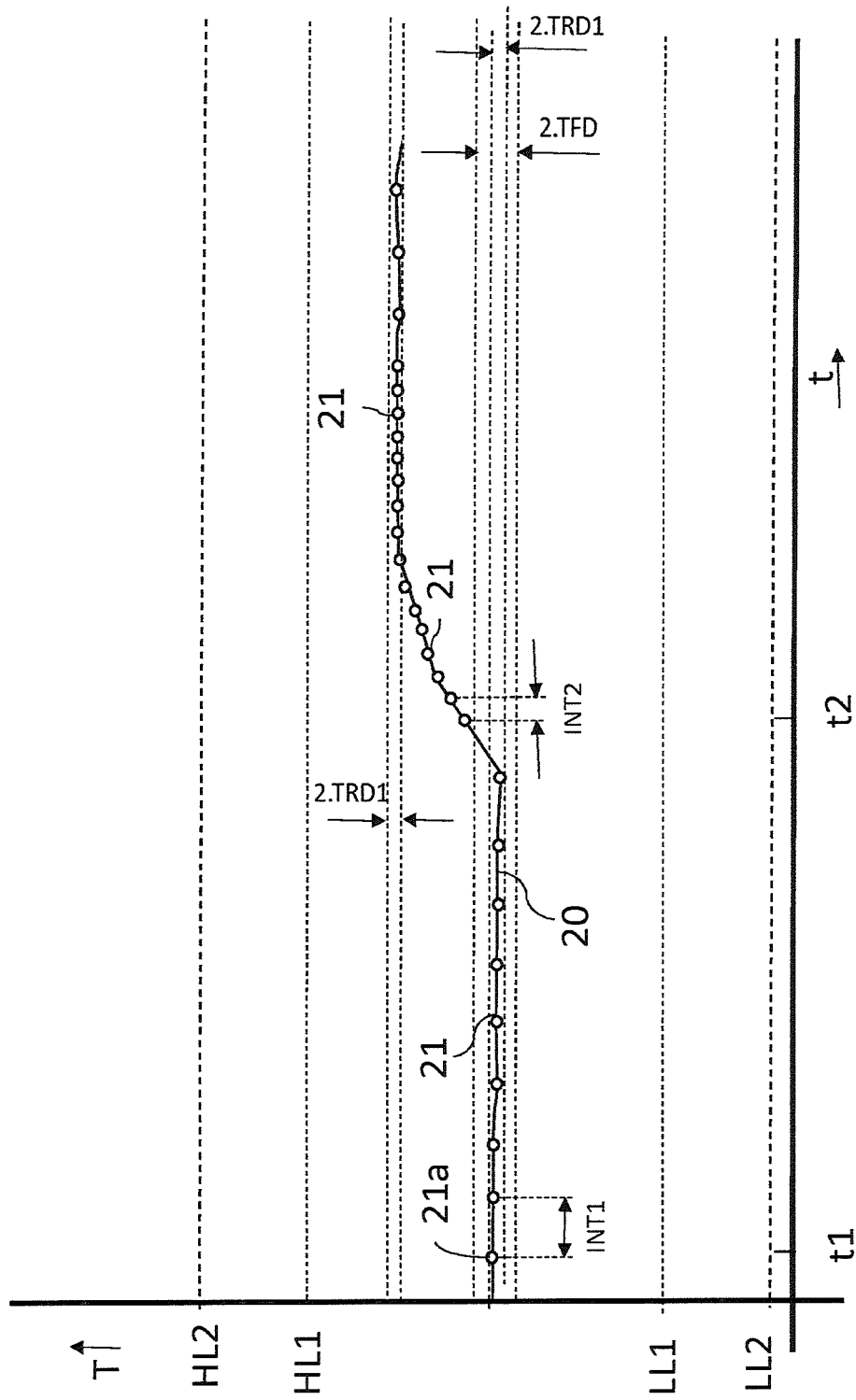
FIG. 2 shows the ambient temperature T as function of a time t and sample values of the samples acquired by the data logger.

FIG. 2 shows an environment parameter in the form of the ambient temperature T, indicated by a line 20, as function of a time t. Sample values of the samples acquired by the sampling subsystem 2 are indicated by the dots 21 on line 20. For clarity reasons only a few dots are indicated by reference numbers 21. The sampling is started at t1. The first sample taken is indicated by reference sign 21a. The sample value of the first sample is stored in predetermined bits of a data record in a memory by a memory subsystem 4. This value is also used as a reference value $T_{ref}$ as will explained later on in the description in more detail. The length of the sample intervals at the beginning of the sampling is set to a value INT1. A suitable value for INT1 is 20 minutes.

For each next sample it is detected whether the variation of the sample meets a first stability criterion. This indicates that the temperature T stays stable. An accurate criterion is to check whether the difference between a sample value $t_n$ and the sample value $T_{ref}$ stays within a stability range Tr, determined by an upper limit and a lower limit. As will be explained later on in more detail different stability ranges are used for different ranges of the temperature T. The stability ranges for the different temperature ranges are hereinafter indicated by Trx, with x referring to the corresponding temperature range. The distance between the limits of the stability range Trx and the reference value $T_{ref}$ are determined by a criterion parameter TRDx. In FIG. 2 the criterion parameter TRD1 shown belongs to the temperature range between LL1 and HL1. In case TRD1 lies symmetric around the reference value $T_{ref}$ and when this first stability criteria is met and the sample value $T_n$ stays between $T_{ref}$-TRD1 and $T_{ref}$+TRD1 the stability criterion for the temperature range HL1-LL1 is met and a count is incremented. Preferably the count is stored in predetermined bits of an actual opened data record. A suitable value for TRD1 is e.g. 2.5° C.

It will be clear for the skilled person that several other methods are suitable to determine whether the temperature T stays stable. Another possible stability criterion is a detection whether the sample value $T_n$ at sample moment to is within a stability range Tr, determined by an upper limit and a lower limit around the value $T_{n-1}$ of the previous sample. It is also not required to determine the stability of the ambient temperature on the basis of samples values. Stability of the temperature T can also be determined by means of a dedicated sensor which measures the change of temperature as function of the time.

As long as the first stability criterion is met the counter in the actual data record is increased with an increment each time a new sample is acquired until the counter reaches a predetermined end count $C_{end}$. Then the data in the actual opened data record is frozen and a new data record is opened in the memory subsystem 4. A suitable counter is a 4 bits counter and suitable value for the end count $C_{end}$ is "16". However, counters with another counting range and another end count can be used.

Figure 3:
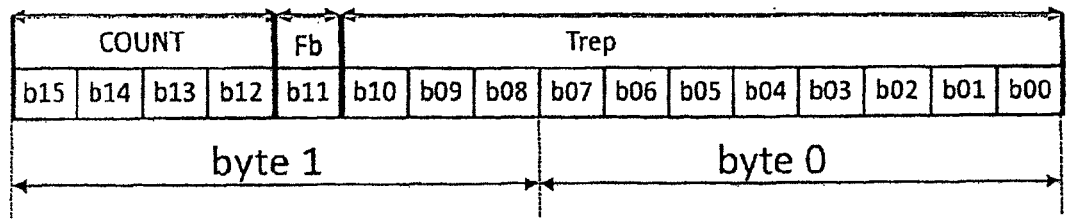
FIG. 3 shows an example of suitable format for the data records.

An example of a suitable format for the data record defined when the predetermined count is reached, is shown in FIG. 3.

The format comprises a 16-bit word consisting of 2 bytes (byte 0 and byte 1). 4 bits (b12 to b15) are reserved for storing the count of the counter. One bit (b11) is available for indicating which of two different sample intervals INT1 or INT2 is used for the samples represented by the data record. The counts represent the number of samples of the group of successive samples taken since the start of the counting. 11 bits (b00-b10) are reserved for storing a representative value $T_{ref}$ for the sample values of the samples belonging to this group. In this embodiment this is the value of the first sample of the group.

However other representative values are suitable, for example the value of another sample of the group, or a value which is the average of all samples of the group. As long as the ambient temperature stays stable in this way data records representing the value of 16 successive samples are defined and stored. However as soon as it is determined that the temperature is not stable any more (as is the case at t2), by detection that a new sample value is outside the stability range TR1 the data in the actual opened data record is frozen and a new data record is opened. The value of the first sample determines the representative value $T_{ref}$. This value, stored in the bits b00-b10 and the count, stored in the bits b12-b15, are now definitely stored in of the frozen data record. The newly opened data record starts with all bits at zero. So each time the stability information indicates that the temperature is not stable the actual data record is frozen a new data record is opened and the process of storing $T_{ref}$, checking whether the stability criterion is met and updating the count is repeated.

Note that in the above embodiment each data record can represent a group of 16 successive stable sample values at the most. It will be clear for the person skilled in the art that the maximum can be set to any value but limited by the counting range of the counter.

In FIG. 2 boundaries of a first temperature range are indicated by a lower value LL1 and a higher value HL1. This first temperature range defines a prescribed storage range for the temperature T. As long as the temperature T stays within the first range the efficacy of the medication is guaranteed sufficient until the so called expiry date. If the temperature T exceeds the boundary of the first range this affects the efficacy of the medication. The extent to which the efficacy is affected depends on the time duration that the temperature left the first temperature range HL1-LL1 and to which extent the temperature exceeds the boundaries of the first temperature range HL1-LL1 during this time duration. If the exposure of the medication to a temperature outside the first temperature range HL1-LL1 stays limited then the reduction of the efficacy of the medication will be small, so that the medication can still be used. However if the duration and/or the extent of the exceeding is substantial then the effect on efficacy of the medication can be so high that it cannot be used anymore. On the basis of the behaviour of the temperature outside the first range it can be determined whether the medication can be still be used or not. For an accurate estimation of the reduction of the efficacy it is important that the behaviour of the temperature T outside the first range (the usual storage range HL1-LL1) is known accurately, this in contrast with the behaviour of the temperature within the first range, where the effect of the temperature on the efficacy is very limited. To determine an accurate excursion of the temperature, also the measurement interval time is important and it therefore beneficial to set the sampling to a shorter sampling interval INT2 in case a fast temperature change is detected for temperatures outside the range HL1-LL1. The use of the shorter sampling interval is indicated in the data record by setting bit b11.

Further for some temperature sensitive medications there may be a maximum allowable storage temperature HL2 and a minimum allowable storage temperature LL2. These absolute maximum and absolute minimum temperatures HL2 and LL2 are indicated in FIG. 2. In case one of these temperatures LL2 or HL2 are reached then the efficacy cannot be guaranteed anymore and the medication may not be used anymore. The same as for stability range HL1-HL2 and range LL1-LL2, the effect of excursions on the efficacy (usually by means of the so-called Mean Kinetic Temperature) can be accurately calculated) when the measure interval time is short and when the temperature passes the border of HL1 or HL2 or LL1 or LL2, the interval time INT2 may be switched in.

With the above in mind the inventor had the insight that the stability range Tr of the first stability criterion can be different for the different ranges without that this effects inaccuracy for medication monitoring. In particular the width of the stability range for samples within the range HL1-LL1 can be relative large compared with the stability range for samples outside the range HL1-LL1. It results in a substantial reduction of the required storage capacity of the memory 7.

In FIG. 2 the following ranges can be distinguished. The first range with temperature values between HL1 and LL1, a second range between HL1 and HL2, a third range between LL1 and LL2, a fourth range with temperatures above HL2 and a fifth range for temperatures below LL2.

Since for the second and third range it is much more important to have accurate data about the behaviour of the temperature than for the first range (between HL1 and LL1), the fourth range (above HL2) and the fifth range (below LL2), the value of TRD2 for the second and third range may be smaller chosen than for the other ranges.

So only for the second or third range a tight setting of the first stability criterion may be required. For the other ranges a less tight setting of the first stability criterion suffices. For each of the ranges the criterion parameter TRDx can be set independently from each other. A less tight setting for the ranges outside the second and third range results in that the sequences of samples which meets the first stability criterion are longer and consequently less code words are required to represent the temperature behaviour.

It is to be noted that the application of the invention is not limited to the embodiment described herein before. It will be clear that it also applies for other environment parameters than the temperature which has an effect on the efficacy of the medication. Also other criterion parameters than TRD1 can be used to make the first stability criterion tighter for the ranges for which it is important that the behaviour of environment parameter is known more accurate.

According to the invention the data logger is arranged to use different stability criteria for different ranges of the temperature. This can be realized by setting at least one parameter of the first stability criterion to different values for different ranges of the physical environment parameter, which criterion parameter determines a condition which has to be fulfilled to meet the criterion. In the embodiment described hereinbefore the settable parameter of the first stability criterion is TRDx, which indicates the allowable variation of values the subsequent samples of the environment parameter around the reference value $T_{ref}$.

Suitable values for the settable parameter TRD1 of the first stability criterion are e.g. 2.5° C. and a suitable value for the criterion parameter TRD2 for the second and third range e.g. 0.5° C.

Note that a reduction of the required storage capacity is already achieved when two ranges are defined, for example a first range between LL1 and LH1 with a less tight setting of the first stability criterion and a second range above LH1 with a tight setting of the stability criterion.

However an increased reduction of the memory capacity can be reached with a data logger which is arranged to set different criterion parameters for at least three subsequent adjacent ranges, of which a first one is located between a second one and third one of the three ranges, whereby the value of the criterion parameter for the first range prescribes a less stable behaviour of the sample values than the values of the criterion parameter for the second and third range.

The value of the criterion parameter can be kept the same for the environment parameter values in the second and fourth range on both sides of the maximum HL2 and/or in the third and fifth range on both sides of the minimum LL2.

However, it is preferred to have a less tight first stability criterion when the maximum or minimum value is exceeded.

So the data logger is preferably arranged to set criterion parameters for at least a fourth range which is adjacent to the second or third range, whereby the value of the criterion parameter for fourth range prescribes a less stable behaviour of samples values than the value of the criterion parameter for the range the adjacent of the second or third range.

In the above described embodiments the stability range Trx, used for the determination whether the temperature is considered to be stable, is located symmetrically around the value of the sample value $T_{ref}$.

It is in some cases beneficial to locate this stability range asymmetrical around the sample value $T_{ref}$ when the temperature value is outside a range between HL1 and LL1 (See FIG. 2). Within the temperature range between HL1 and LL1 the stability range Tr1 is symmetrically around $T_{ref}$ (in this embodiment to ±2.5° C.). The stability range can be set automatically to a tighter value when the temperature is substantial above the required storage temperatures, indicated by HL1 in FIG. 2. When the higher temperature HL1 is reached, the stability range is changed to e.g. +0.125° C. and −0.5° C. around the sample value $T_{ref}$.

Also in case the temperature T is substantial below the required storage temperature, indicated by LL1 in FIG. 2 the stability range Tr is also made more tight. When the lower temperature LL1 is reached the stability range Tr is changed to e.g. −0.125° C. and +0.5° C. around the previous sample value $T_{ref}$. This will increase the accuracy for the specified temperature ranges i.e. biological medications the storage conditions are mostly specified between +2.0° C. and +8.0° C.

The values for instance TRD1, TRD2, TRD3, HL1, HL2, HL3, LL1, LL2 and LL3 are stored in the data logger, for example in the firmware.

Figure 5:
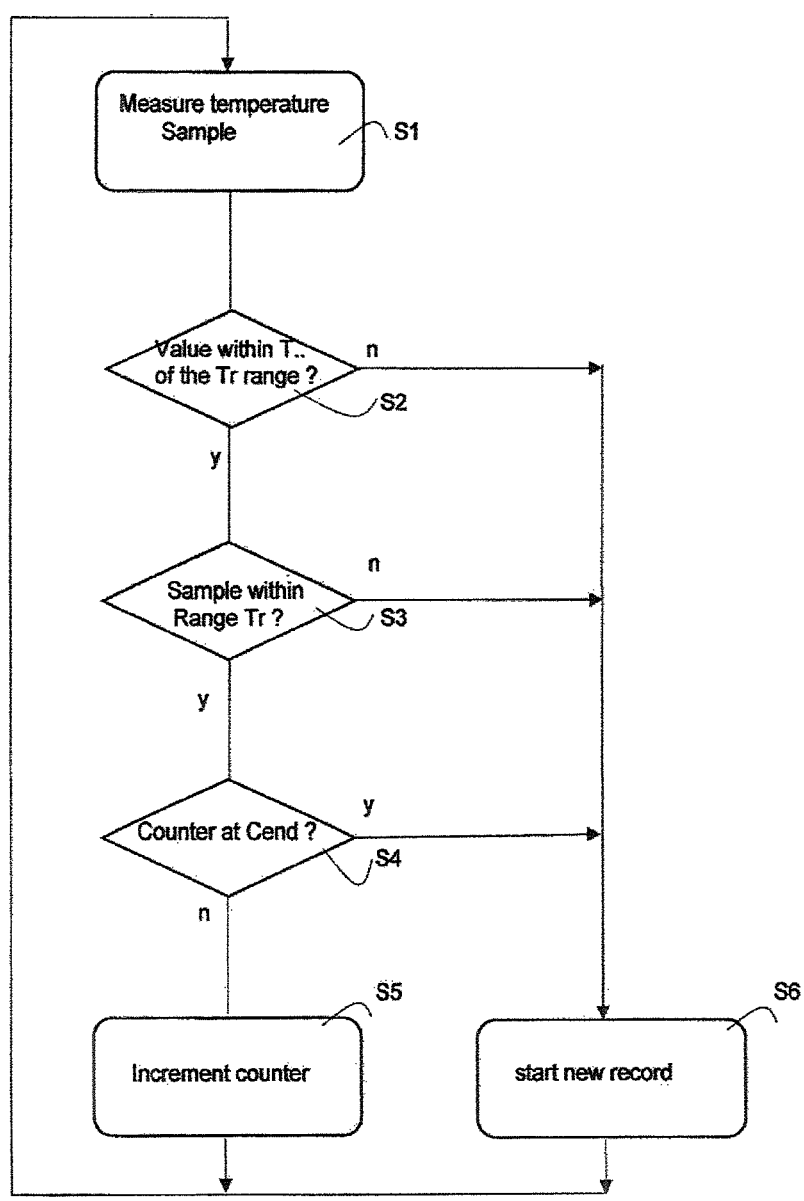
FIG. 5 shows a flow diagram for a program executed by a program controlled processor of the data logger.

FIG. 5 shows a flow diagram of an embodiment of a program stored in the program memory 9 of the data logger 1, which when executed take care of the encoding of the sample values. In step S1 a new sample is taken. In step S2 it is detected whether the sample is still within same temperature range belonging to the actual $T_{ref}$. In S3 the stability range TRx belonging to the actual value of $T_{ref}$ is determined using a look up table which comprises a value TRDx for each of the temperature ranges. Finally, it is checked whether the sample is within the this determined stability range TRx. When in S2 or S3 the result is "No", a new record with the sample value $T_{ref}$ (stored in the bits b00-b10 of the newly opened data record) will be started. If the criteria in S2 and S3 are met, in step S4 it will be checked whether the counter is to its end value $C_{end}$ from the previous samples and if not, the counter will be incremented. If the counter has reached its end value, a new record with the sample value $T_{ref}$ will be started.

Figure 6:
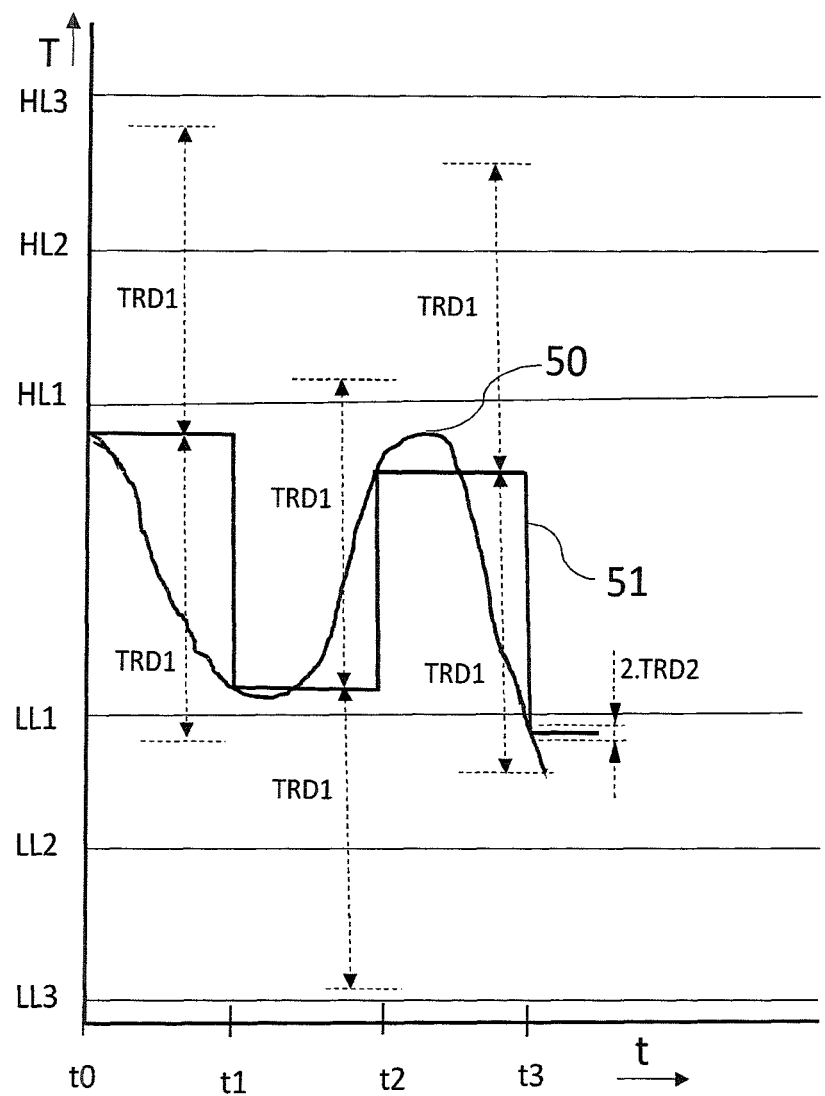
FIG. 6 shows a typical behaviour of the temperature to be logged by the data logger.

In the above described embodiments a criterion parameter TRDx defining the stability range Trx, is used for the determination whether the temperature is considered to be stable, is located around the value of the sample value $T_{ref}$. For certain applications of the data logger, in particular for applications for monitoring medication the exact value of the temperature is not critical for temperature within the usual storage range, i.e. between LL1 and HL1. For these applications a wide variation range Trx can be used which allows any values between LL1 and HL1. This can be simply realized by choosing a value for TRD1 which is equal to the range temperature range HL1-LL1, as illustrated in FIG. 6. In this figure a line 50 indicates the behaviour of the temperature T as function of time t. The temperature T is sampled by the sampling subsystem 2 at regular sampling intervals, (samples are not shown). Starting at t0 a new data record is opened in which the latest sample value is stored as $T_{ref}$ in the bits b00-b10. In step S2 it is determined that the sample is within the range LL1-HL1. In step S3 the corresponding value criterion parameter TRD1 defining TRD1 is read from the look up table. For the range LL1-HL1 the value of TRD1 is chosen equal to width of the range LL1-HL1. As long as no sample value is outside the range HL1-LL1 or the variation range TRD1 the process of checking in S2 and S3 and incrementing the count in step S5 continues until at t1, the counter reaches its end value $C_{end}$. Then in step S6 the data in the actual data record is frozen and definitely stored and new data record with the latest sample value as $T_{ref}$ is stored in the newly opened data record. The start value ($C_{start}$) for the counter, represented by the bits b12-b15 for the counter is equal to zero. (All bits of a new data record have an initial value equal to 0). The program loop consisting of the steps S1, S2, S3, S4 and S5 is repeated until the counter reaches its end value $C_{end}$ again at t2, resulting in the definite storage of the data of the actual data record and opening a new data record with an initial count value zero ($C_{start}$) and a new $T_{ref}$ equal to the last sample taken. The process of defining a new variation range, checking whether the samples remains within this variation range and incrementing the counter is performed again until at t3 the end value $C_{end}$ of the counter is reached again. At t3 a new sample is taken. This sample is for instance located outside the range LL1-HL1. Now the value TRD2, defining the stability range Tr2 belonging to the range HL1-HL2, is read from the look up table.

The value of TRD2 may be substantially smaller than the value of TRD1 used for the range LL1-HL1, which results in much smaller variation range Tr2, and consequently to a much more accurate monitoring of the behaviour of the temperature T.

As it is clear from the above, as long as the subsequent temperatures are within the entire first range LL1-HL1 the counter is increased irrespective of the change in temperature and the interval time to the long sample time interval INT1. Once the counter has reached its end value $C_{end}$ a new data record is defined and stored and the process is repeated as long as the temperature remains within the first range. In case the counter reaches its end value $C_{end}$ with 16 increments each data record represents 16 samples as long as the samples remain within the range LL1-HL1, resulting in a high data compression and long interval time for the samples in this range.

The temperature behaviour represented by the stored data records is in FIG. 6 indicated by line 51. The deviation between the real behaviour (line 50) and the behaviour represented by the data records is relative large for the temperatures within the range LL1 and HL2. However, the exact behaviour within this range is not crucial. When the Temperature leaves the range LL1-HL1 the monitoring becomes accurate due to a much narrower variation range.

In the embodiment described with reference to FIG. 5 different stability criteria are obtained by using different values for TRDx. However, it is to be noted that different stability ranges for different ranges of the environment parameter can be realized in other ways. Further note that different types of stability criteria can be used for the different ranges. For example, it is possible to use a stability criterion of the range LL1-HL1 which only checks whether the samples remain within this range. It is only important that the different stability criteria prescribe different stability behaviours of the temperature for different temperature ranges. In other words there is one temperature range for which the stability criterion prescribes a more stable behaviour of the temperature than the stability criterion for another temperature range.

In the embodiments described hereinbefore tight stability criteria may be used for the temperature range between HL1 and HL2 and the temperature range between LL1 and LL2. Less tight stability criteria may be used for the temperature range between LL1 and HL1 and the temperature range above HL2 and the temperature range below LL2. It will be clear for the skilled person that the invention is applicable to embodiments wherein the number of ranges with different stability criteria is at least two. The maximum number of ranges is not limited to five as described hereinbefore. The invention is applicable for any number of ranges greater than two. Further the invention gives the option to the user to define ranges for which an accurate monitoring is required and ranges for which a less accurate suffice and define a stability criterion for each range dependent on the required accuracy. For example, in FIG. 6 seven temperature ranges can be distinguished. These are the range with A range with temperature values above HL3 with criterion parameter TRD4 defining a stability range Tr4

A range with temperature values between HL3 and HL2 with criterion parameter TRD3 defining a stability range Tr1

A range with temperature values between HL2 and HL1 with criterion parameter TRD2 defining a stability range Tr2

A range with temperature values between HL1 and LL1 with a criterion parameter defining Tr1

A range with temperature values between LL1 and LL2 with criterion parameter TRD2 defining a stability range Tr2

A range with temperature values between LL2 and LL3 with criterion parameter TRD3 defining a stability range Tr3

A range with temperature values below LL3 with criterion parameter TRD4 defining a stability range Tr4

It may happen that the temperature changes fast. In such situations it is useful to have a shorter sample interval so that more details about the behaviour of the temperature are stored.

In order to make the data logging measuring interval time dependent on the speed of the temperature variation, it is detected whether the speed with which the temperature change is above a predefined threshold level. This can be realized by checking whether a variation speed dependent criterion is met. This can for example be done by checking for sample values in the ranges HL2-HL1 and LL1-LL2 whether the sample value Tn is within a second stability range TF around the value $T_{ref}$. In case the stability range lies symmetric around the sample value $T_{ref}$ the second stability criterion is met, in case the samples values $T_n$ stays between $T_{ref}$-TFD and $T_{ref}$+TFD, whereby TFD is greater than TRD. A suitable value for TFD may be 2° C.

In response to such detection the length of the sample interval is set to INT2 which is in most cases smaller than INT1 i.e. samples will be taken more frequently. In this embodiment the value of INT2 is chosen equal to 2 minutes as an example.

If the temperature stabilises again, so that the variation between successive samples is less than +0.5° C. (TRD2), then the counter will reach again its end value $C_{end}$ after which a new 2 byte data record will be defined in which the bit 11 is set to "0" indicating that the longer sampling interval INT1 is used.

Moreover, the sampling interval is set back to INT1.

It is also possible to keep the INT2 interval measuring time active while the registrations of the temperature values are in accordance with the INT1 timing, i.e. sample measurements are done more frequently but the storage of the values are according INT1 criteria if the INT2 criteria are not met.

If two different sample intervals are used, then for the reconstruction of the logged temperature behaviour it is required to know which data records are based on samples acquired with sample interval INT1 and which data records are based on samples which are acquired with sample interval INT2.

In this embodiment this is solved means of a flag Fb in the data record. In the format of FIG. 3 bit b1 is reserved for the flag Fb. The flag Fb is set to the binary value "0" for samples based on samples with sample interval INT1 and set to binary value "1" for samples bases on samples with sample interval INT2.

In this embodiment only two different sample intervals are used. However embodiments wherein more than two different sample time intervals are possible, in that case more than one flag bit has to be included in the data records.

In the embodiment described hereinbefore advantageous use is made of the fact that in case the temperature is stable, the sample time interval can be extended. This substantially decreases the demand for memory storage space. Also by using different settings of the first stability criterion the required storage capacity can be reduced.

It is to be noted that the application of different sample intervals and/or the use of the different settings of the stability criterion is not limited to the embodiments in which a compression is as described hereinbefore, wherein the compression is realized by an encoding in which groups of subsequent samples, which meets the stability criterion, are represented by a code word in which predetermined bits are used for the sample value and other predetermined bits are used for the number of samples in the sequence of samples represented by the code word.

The application of different sample intervals and/or the use of the different settings can also be used for any data logger for logging values of a physical environment parameter as a function of time, which comprises a sampling subsystem for acquiring sample values of the physical environment parameter at sampling moments which are separated by sample intervals, an encoding subsystem for defining data records representing groups of one sample value or a number of successive sample values with variations which meet a first stability criterion, and a memory subsystem for storing a sequence of defined data records into a memory.

For example, instead of an encoding method in which the absolute value of the environment parameter is stored in the code word (as described with reference to FIG. 2 and FIG. 3) it is also possible to store the difference of the environment parameter with a reference value which is stored in the header. Instead of the number of samples represented in the code word it is also possible to assign a sequence number to each sample and to store only the code words (together with the sequence number) for which the difference with the previous stored code word exceeds a predetermined threshold. Such encoding is for example disclosed in US20070267509.

For the beneficial application of different sample intervals and/or the use of the different settings of the stability criterion it is not essential how the sequence of subsequent samples are represented in the code word.

A further embodiment of the data logger is arranged to store in a memory start information indicating a moment in time, for example the date and time, that the monitor process is started. The benefits of this solution is that only the information for one moment in time must be stored and all other sample times and dates can be calculated based on this moment in time and the code words stored in the memory. This memory for storing the time and date can be a part of the memory used for storing the data packets.

Alternatively, data logger 1 can be provided with a separate memory 6 for storing this information. In case the data logger is arranged to disable overwriting of the start information after it has been stored for the first time, for example by using a write once memory, this start information cannot be changed anymore after it is written into the memory, so that the start information is stored in a very secure and reliable way.

In the embodiment described with reference to FIG. 1 and FIG. 2 the subsystems are indicated as separate parts. However, it will be clear for the skilled person that the subsystems can use partly or completely the same components of the data logger, which will usually be the case when a software controlled processor is used. In that case the subsystems make use of the same processor which is controlled with different programs for the different subsystems, which programs are stored in the same program memory.

Figure 4:
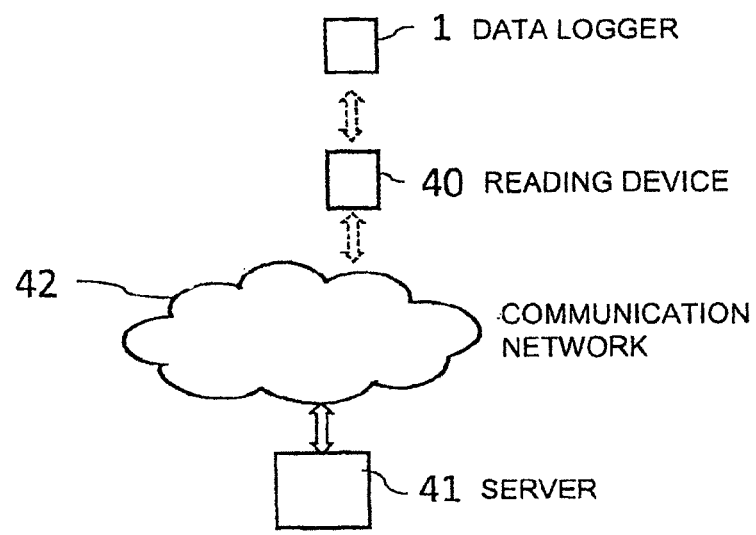
FIG. 4 shows a preferred context in which the data logger according to the invention is used.

FIG. 4 shows a preferred context in which the data logger according to the invention is used. This FIG. 4 shows a combination of a data logger 1 according to the invention in combination with a reading device 40 according the invention. The reading device 40 is of a type which is able to read the data records stored in the data logger 1. A very suitable reading device is a Smartphone with can read the record dates from the data logger. This can be via a wired connection between the reader device 40 and the data logger 1. However, a wireless connection is preferred. As the wireless connection a connection using NFC-technology is preferred. An NFC enabled Smartphone with a suitable reading App can be used as a reading device for reading the data records from the data logger 1. A reading device according to the invention is provided with a decoder for reconverting the data records into the sample values of the sampled physical environment parameter so as to reconstruct the time behaviour of the monitored environment parameter. In case for the data records have the format as shown in FIG. 3 the reading device is arranged to convert data records in a sequence of M sample values having the representative value defined in the example by the bits b00-b10 of the data records. The number of the successive sample values is derived from the count stored in the bits b12-b15.

Based on the reconstructed time behaviour it can be estimated how much the efficacy of the medication is reduced during the storage period. For a reliable interpretation of the time behaviour it is crucial that the reconstructed time behaviour has a uniform time scale for the complete period. In other words for each reconverted sample value the correct time difference $t_{def}$ between the start of the data logging has to be known. For each reconverted sample this time difference $t_{def}$ is the sum of the sampling intervals of all preceding samples. This time difference of each next sample is calculated by adding the sampling interval with which the sample is taken to the time difference belonging to the previous sample, using the following mathematical relation $tdef_n = tdef_{n-1} + dt_{n-1}$.

In case an embodiment of the data logger is used with sampling interval which is settable to different values the sampling interval $dt_n$ is derived on the basis of the flag bit Fb in the data record.

Preferably the decoder is implemented by means of a software controlled processor and a program memory with command codes, which when executed performs the reconstruction as described hereinbefore.

In case of the use of a Smartphone for the reading device the Smartphone can be loaded with an App for reading and decoding the data records and display the logged temperature behaviour as a list, table or graph on the display of the Smartphone.

By assessing the logged temperature behaviour shown on the display it can be determined whether or not the efficacy of the medication is still sufficient to use the medication. This assessment can be supported by the App in case it is provided with an algorithm which estimates on the basis of the reconstructed temperature behaviour the effect of the behaviour on the efficacy of the medication and displays the result of the estimation on the display, for example by a visible indication such as an message (in words or symbol) indicating whether the efficacy of the medication is still sufficient to be used or not. This can be very helpful, in particular for the user of the medication which in general will not have the knowledge to understand in detail the effect of the temperature behaviour on the efficacy of the medication. Note that the application of a reading device which displays an indication of the efficacy of the medication on the basis of data, stored in a data logger, is not limited to encoding methods described. This feature is in principle applicable for each data logger with data from which the time behaviour of the environment parameter can be reconstructed. The algorithms for estimating the effect of the temperature behaviour on the efficacy on the medication are well known. Usual these algorithms calculates the Mean Kinetic Temperature (MKT). The algorithms for calculating the MKT on the base of the time behaviour of the temperature as such are no subject of the invention and for these reasons not described in detail.

Preferably the App is made available for downloading on a server 41, which is connected to a communication network 42, such as for example the internet.

By downloading the App onto the Smartphone the Smartphone is transformed into a reading device which is able to make the logged data visible for the user in comfortable way.

The data logger is very suitable for monitoring the storage conditions of medication and food and for instance flowers. Due to miniaturization of the electronic circuitry the sampling and encoding part of the data logger can be very small and consequently very cheap. Moreover, by using the encoding method according to the invention very efficient use is made of the memory capacity, so that a memory of only a limited size is required for storing the sampled data over a very long period (e.g. several years). So overall the data logger can be produced with only a very small fraction of the costs of the medications monitored.

By using a Smartphone loaded with a dedicated App the temperature behaviour during the storage of the food or medication package can be made visible in a comfortable way with no hardware costs for the user.

So the invention offers a cheap, easy to use, high quality solution for monitoring the storage conditions of medications.

However, it will be clear that application field of the invention is not limited to monitoring the storage conditions of medications. The invention is very beneficial for all applications for which there is a need to monitor the storage conditions of a product over a long period against limited costs.

Although several embodiments of the present invention have been illustrated in the accompanying drawings and described in the above detailed description, it will be understood that the invention is not limited to the embodiments disclosed, but is capable of numerous modifications without departing from the scope of the invention as set out in the following claims.

For example, embodiments in which only samples are encoded which have values which are above or below a predetermined range fall within the framework of the invention.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit can fulfil the functions of several items recited in the claims. The mere fact that certain measures are recited in mutually different dependent claims does not indicate that a combination of these measures cannot be used to advantage. Any reference symbol in the claims should not be construed as limiting the scope.

The invention claimed is:

1. A data logger for determining the quality of medications or foods in relation to a physical environment parameter as a function of time, wherein the data logger comprises:
   A) a measurement device for periodically physically measuring, when in close proximity to the medications or foods, a physical environment parameter of medications or foods selected from one of the following parameters:
      ambient temperature,
      humidity,
      light intensity,
      movements and
      noise,
   B) a sampling subsystem for acquiring a sequence of sample values of the physical environment parameter of the medications or foods at sampling moments which are separated by sample intervals,
   C) an encoding subsystem arranged for converting the sequence of sample values in data records, each record including:
      a representative value of one of:
         one sample value with variations which meet a stability criterion of the medications or foods and
         a group of successive sample values with variations which meet a stability criterion of the medications or foods, and
      wherein the data records include information representative of lengths of the sample intervals, and
   D) a memory subsystem for storing a sequence of the data records into a memory, and
   E) a processor for:
      1) controlling the encoding subsystem of the data logger to use different stability criterions for at least two predetermined ranges of the environment parameter for each medication or food, with at least two of the ranges being adjacent,
2) determining in which range a sample of the environment parameter of the medications or foods is located,
3) selecting one of the different stability criterions for the encoding which is dependent on the determined range,
4) prescribing the range dependent stability criterion of a first one of two ranges to be a more stable behaviour of the environment parameter of the medications or foods than the range dependent stability criterion for the other one of the two adjacent ranges such that the interval between samples of the first one of the two ranges is greater than the interval between samples of the other of the two ranges which results in a reduction of required storage capacity of the memory,
5) defining the criterion which prescribes the more stable behaviour to be a stability range around the representative value,
6) determining that the stability criterion is met for subsequent sample values in case all sample values of the sequence are within the stability range,
7) providing that the stability range is asymmetrically positioned around the representative value, such that a part of the stability range that is positioned between the reference value and a boundary between the adjacent ranges is larger than a part of the stability range which is positioned on the other side of the representative value,
F) a reading device for reading out the data records from the memory for determination of the quality of the medications or foods, and
G) an interface for transporting the data records stored in the memory to the data reading device.

2. A data logger as claimed in claim 1, whereby the processor controls the encoding subsystem of the data logger to set at least one parameter of the range dependent stability criterion to different values for different ranges of the physical environment parameter, which criterion parameter determines a condition which has to be fulfilled to meet the criterion.

3. A data logger as claimed in claim 1,
wherein the data logger is arranged to set different criteria for at least three subsequent adjacent ranges, of which a first one is located between a second one and third one of the at least three ranges, and
wherein the range dependent stability criterion for the first range prescribes a less stable behaviour of the sample values than the range dependent stability criteria for the second and third ranges.

4. A data logger as claimed in claim 3,
wherein the data logger is arranged to set criterion parameters for at least a fourth range which is adjacent to the second or third range,
wherein the value of the criterion parameter for the fourth range prescribes a less stable behaviour of samples values than the value of the criterion parameter for the range adjacent the second or third range.

5. A data logger as claimed in claim 1, wherein at least for one range the range dependent stability criterion is such that the criterion is met as long as the physical environment parameter remains within the said one range.

6. A data logger as claimed in claim 1, further comprising an interface enabling a transport of the data records stored in the memory to a data reading device.

7. A data logger as claimed in claim 1, wherein the memory subsystem is arranged to store a start date and start time that a monitor process is started in the memory of the data logger.

8. A data logger as claimed in claim 7, wherein the data logger is arranged to disable overwriting the start date and start time.

9. A data logger as claimed in claim 1, for use in a package including a medication.

10. A data logger as claimed in claim 9, wherein the package comprises one of a syringe and a vial with medication.

11. A data logger for determining the quality of medications or foods in relation to a physical environment parameter as a function of time, wherein the data logger comprises:
A) a measurement device for periodically physically measuring, when in close proximity to the medications or foods, a physical environment parameter of medications or foods selected from one of the following parameters:
ambient temperature,
humidity,
light intensity,
movements and
noise,
B) a sampling subsystem for acquiring a sequence of sample values of the physical environment parameter of the medications or foods at sampling moments which are separated by sample intervals,
C) an encoding subsystem arranged for converting the sequence of sample values in data records, each record including:
a representative value of one of:
one sample value with variations which meet a stability criterion of the medications or foods and
a group of successive sample values with variations which meet a stability criterion of the medications or foods, and
wherein the data records include information representative of lengths of the sample intervals, and
D) a memory subsystem for storing a sequence of the data records into a memory, and
E) a processor for:
1) controlling the encoding subsystem of the data logger to use different stability criterions for at least two predetermined ranges of the environment parameter for each medication or food, with at least two of the ranges being adjacent,
2) determining in which range a sample of the environment parameter of the medications or foods is located,
3) selecting one of the different stability criterions for the encoding which is dependent on the determined range,
4) setting a length of the sample interval to a first length and to a second length which is less than the first length, such that the interval between samples of the first length results in a reduction of required storage capacity of the memory,
5) controlling the sampling subsystem to set the length of the sample interval time to the second length in response to a detection that a variation speed dependent stability criterion is not met, wherein the variation dependent stability criterion indicates that the speed with the physical environment parameter of the medications or foods changes over time exceeds a predefined level, and F) a reading device for reading out the data records from the memory for determination of the quality of the medications or foods, and G) an interface for transporting the data records stored in the memory to the data reading device.

12. A data logger as claimed in claim 11, wherein the processor converts the sequence of samples in a sequence of data records, in which each data record comprises:

a first number of bits representing the representative value of the group of samples represented by a data word, a second number of bits representing a count indicating the number of samples in the group and at least one bit indicative for the length of the sample interval.

13. A data logger as claimed in claim 11, wherein the processor resets the length of the sample interval to the first length in response to a detection that a number of subsequent sample values which meets a corresponding range dependent stability criterion has reached a threshold value.

14. A data logger as claimed in claim 11, wherein the encoding subsystem is arranged to include at least one flag bit in the record indicating the sampling interval for the samples represented by the data record.

15. A data logger as claimed in claim 11, whereby the processor controls the encoding subsystem of the data logger to set at least one parameter of the range dependent stability criterion to different values for different ranges of the physical environment parameter, which criterion parameter determines a condition which has to be fulfilled to meet the criterion.

16. A data logger as claimed in claim 11, wherein the processor sets different criteria for at least three subsequent adjacent ranges, of which a first one is located between a second one and third one of the at least three ranges, and wherein the range dependent stability criterion for the first range prescribes a less stable behaviour of the sample values than the range dependent stability criteria for the second and third ranges.

17. A data logger as claimed in claim 16, wherein the processor sets criterion parameters for at least a fourth range which is adjacent to the second or third range, wherein the value of the criterion parameter for the fourth range prescribes a less stable behaviour of samples values than the value of the criterion parameter for the range adjacent the second or third range.

18. A data logger as claimed in claim 11, wherein at least for one range the range dependent stability criterion is such that the criterion is met as long as the physical environment parameter remains within the said one range.

19. A data logger as claimed in claim 11, further comprising an interface enabling a transport of the data records stored in the memory to a data reading device.

20. A data logger as claimed in claim 11, wherein the memory subsystem is arranged to store a start date and start time that a monitor process is started in the memory of the data logger.

21. A data logger as claimed in claim 11, for use in a package including a medication.

* * * * *